(12) United States Patent
Beuth, Jr.

(10) Patent No.: US 10,328,532 B2
(45) Date of Patent: Jun. 25, 2019

(54) PROCESS MAPPING OF AVERAGE TEMPERATURES AND PROCESS SENSITIVITY

(71) Applicant: Carnegie Mellon University, Pittsburgh, PA (US)

(72) Inventor: Jack Lee Beuth, Jr., Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 382 days.

(21) Appl. No.: 14/776,446

(22) PCT Filed: Mar. 14, 2014

(86) PCT No.: PCT/US2014/029192
§ 371 (c)(1),
(2) Date: Sep. 14, 2015

(87) PCT Pub. No.: WO2014/144677
PCT Pub. Date: Sep. 18, 2014

(65) Prior Publication Data
US 2016/0033434 A1  Feb. 4, 2016

Related U.S. Application Data

(60) Provisional application No. 61/852,437, filed on Mar. 15, 2013.

(51) Int. Cl.
*B33Y 40/00* (2015.01)
*B23K 31/12* (2006.01)
(Continued)

(52) U.S. Cl.
CPC ............ *B23K 31/12* (2013.01); *B23K 31/02* (2013.01); *B29C 64/153* (2017.08); *B33Y 40/00* (2014.12); *B23K 2103/14* (2018.08)

(58) Field of Classification Search
CPC ................................ B23K 31/12; B33Y 40/00
(Continued)

(56) References Cited

U.S. PATENT DOCUMENTS

2006/0222043 A1    10/2006  Cahill
2007/0032093 A1*   2/2007   Tseng ................... H01L 21/304
                                                           438/778
(Continued)

FOREIGN PATENT DOCUMENTS

WO   WO02013019663         2/2013
WO   WO 2013019663 A2 *    2/2013   ......... B29C 67/0085
WO   WO02014144677         3/2014

OTHER PUBLICATIONS

Vasinonta et al., "Process Maps for Controlling Residual Stress and Melt Pool Size in Laser-Based SFF Processes", *Solid Freeform Fabrication Proceedings*, 2000, pp. 200-208.
(Continued)

*Primary Examiner* — Igwe U Anya
(74) *Attorney, Agent, or Firm* — Fish & Richardson P.C.

(57) ABSTRACT

In one aspect, a method includes conducting a plurality of tests on process variables of a thermal process, with a test of the plurality of tests being conducted on two or more process variables, the test comprising: locally heating a region of a structure, wherein the local heating results in formation of a thermal field in the structure; assessing one or more temperature integrals of the thermal field; and based on results of the plurality of tests, generating a process map of the one or more temperature integrals of the thermal field, with the one or more temperature integrals based on a function of the two or more process variables.

21 Claims, 10 Drawing Sheets

(51) Int. Cl.
*B23K 31/02* (2006.01)
*B29C 64/153* (2017.01)
*B23K 103/14* (2006.01)

(58) Field of Classification Search
USPC .......................................................... 702/136
See application file for complete search history.

(56) References Cited

U.S. PATENT DOCUMENTS

| | | | |
|---|---|---|---|
| 2008/0082288 A1 | 4/2008 | Raad | |
| 2008/0296270 A1 | 12/2008 | Song et al. | |
| 2011/0155995 A1* | 6/2011 | Hsiao | B82Y 30/00 257/9 |
| 2011/0198336 A1* | 8/2011 | Hoshino | C01B 33/037 219/383 |
| 2014/0249773 A1* | 9/2014 | Beuth, Jr. | B29C 67/0085 702/155 |

OTHER PUBLICATIONS

International Search Report and Written Opinion dated Jul. 23, 2014 for corresponding Int'l. Appln. No. PCT/US2014/029192 (11 pgs.).

* cited by examiner

PROCESS MAPPING OF AVERAGE TEMPERATURES AND PROCESS SENSITIVITY

CROSS-REFERENCE TO RELATED APPLICATION

This application is a § 371 National Stage Application of PCT/US2014/029192, filed Mar. 14, 2014, which, in turn, claims the benefit of priority under 35 U.S.C. § 119(e) to provisional U.S. Patent Application No. 61/852,437, filed on Mar. 15, 2013, and is related to provisional U.S. Patent Application No. 61/852,313, filed on Mar. 15, 2013, International Application No. PCT/US2013/055422, filed on Aug. 16, 2013, and International Application No. PCT/US2012/048658, filed on Jul. 27, 2012, the entire contents of each of which are hereby incorporated by reference.

STATEMENT REGARDING FEDERALLY SPONSORED RESEARCH AND DEVELOPMENT

This invention was made with partial government support under grant CMMI-1131579 awarded by the National Science Foundation. The government has certain rights in the invention.

FIELD OF THE USE

The present disclosure relates to process mapping for manufacturing processes.

BACKGROUND

Additive manufacturing (AM), also known as direct digital manufacturing, refers to a wide range of processes for the direct fabrication of final parts, functional prototypes, or both using rapid prototyping technology. In AM, parts are fabricated by deposition using a heat source to locally soften or melt material in order to fuse added material with existing material. In some AM processes (e.g., those based on friction stir welding), the material is heated enough to allow fusion of added and existing material without melting. In other AM processes, the material is melted, and as the heat source is translated across the part being fabricated, a bead is formed consisting of a moving melt pool with solidified material behind it. Material is fed into the heated region (either directly or by other techniques such as via a powder applied to the surface of the part), and the part is built up by multiple passes to form the part shape. AM is used for Free Form Fabrication ($F^3$), which is the rapid manufacture of a complete part, and for additive manufacturing and repair (AMR), which adds one or more features to an existing component, either as a manufacturing step or for component repair. For instance, AM can be used to build parts from titanium alloys, which has applications in the aerospace and medical implant industries.

SUMMARY

The present disclosure describes methods and apparatus relating to process mapping for manufacturing processes. The techniques described in this disclosure are applicable to a wide range of thermal processing methods. For illustration purposes, the techniques will be described in the context of additive manufacturing involving a melt pool. In these additive manufacturing (AM) processes, a part is fabricated by deposition of successive beads of molten material. AM and other similar manufacturing processes are controlled by primary process variables, including, for instance, heat source power (P), translation speed (V) of the heat source, and feed rate of the source material (MFR).

The techniques described herein provide a method for mapping an integrated (in time or space) characteristic of the thermal field, such as an average melt pool temperature or an evaporation rate from the melt pool. The resulting process maps may be used to identify combinations of process variables yielding the same values of the integrated characteristic or regions of processing space where the integrated characteristic (e.g., evaporation rate) is minimized or maximized. The techniques described herein also provide a method for using process maps generated for any thermal process characteristic (defined by temperatures, temperature derivatives, or temperature integrals) to evaluate sensitivity of that process characteristic to process variable changes.

The techniques described herein are applicable to the deposition of beads of material used to build up complex three-dimensional shapes. The techniques can be applied to processes where no material is added. The techniques can be applied to map the response behavior of any thermal process characteristic in processes that do not include a melt pool. Although AM processes typically use a laser or electron beam as a heat source, the techniques can be applied to processes using any type of heat source.

In one aspect of the present disclosure, a method includes conducting a plurality of tests on process variables of a thermal process, with a test of the plurality of tests being conducted on two or more process variables, the test comprising: locally heating a region of a structure, wherein the local heating results in formation of a thermal field in the structure; assessing one or more temperature integrals of the thermal field; and based on results of the plurality of tests, generating a process map of the one or more temperature integrals of the thermal field, with the one or more temperature integrals based on a function of the two or more process variables.

Implementations of the disclosure may include one or more of the following features. The two or more process variables are each selected from a group comprising a power (P) variable associated with the thermal process, a translation speed (V) variable associated with the thermal process, a material feed rate (MFR) variable (or variable related to MFR) used in the thermal process, one or more structure geometry variables, and a structure temperature ($T_0$) variable. The one or more temperature integrals of the thermal field may include an average temperature across a volume of the thermal field, an average temperature across a surface area of the thermal field, an average temperature at a particular location of the structure over a period of time, or an evaporation rate. The average temperature across the surface area of the thermal field may be determined in accordance with $$T_{avg}^{surf} = \frac{1}{A^{surf}} \int T^{surf} dA^{surf},$$

where $A^{surf}$ is a defined surface area of the thermal field, and $T^{surf}$ is a temperature at a particular location on the surface area of the thermal field. The one or more temperature integrals may be further based on a function of at least one of a location of a heat source and a change in geometry of the structure. The plurality of tests may be conducted with process variables other than the two or more process variables held constant. Generating the process map may include interpolating temperature integrals. The method may include using the process map to select values of the two or more process variables to yield a selected temperature integral of the thermal field, to identify combinations of process variables that yield a particular value of a temperature integral, or to identify regions of process variable space where the one or more temperature integrals are minimized or maximized. The test of the plurality of tests may be conducted on a first process variable, a second process variable, and a third process variable; and the one or more temperature integrals may be based on a function of the first process variable, the second process variable, and the third process variable. The test of the plurality of tests may be conducted on different combinations of more than three process variables; and the one or more temperature integrals may be based on a function of the more than three process variables. The operations of conducting and generating may be implemented by one or more processing devices.

In another aspect of the present disclosure, a method includes conducting a plurality of tests on process variables of a thermal process, with a test of the plurality of tests being conducted on two or more process variables, the test comprising: locally heating a region of a structure, wherein the local heating results in formation of a thermal field in the structure; assessing one or more thermal characteristics of the thermal field; based on results of the plurality of tests, generating a process map of the one or more thermal characteristics of the thermal field, with the one or more thermal characteristics based on a function of the two or more process variables; and using the process map to determine a sensitivity of the one or more thermal characteristics to changes in values of the two or more process variables.

Implementations of the disclosure may include one or more of the following features. The two or more process variables may be each selected from a group comprising a power (P) variable associated with the thermal process, a translation speed (V) variable associated with the thermal process, a material feed rate (MFR) variable (or variable related to MFR) used in the thermal process, one or more structure geometry variables, and a structure temperature ($T_0$) variable. The one or more thermal characteristics of the thermal field may include a dimension of the thermal field, a temperature derivative, a thermal gradient, a cooling rate, a temperature integral, an average temperature, or an evaporation rate. The method may include using the process map to identify combinations of process variables that yield a maximum change in the one or more thermal characteristics. The test may be conducted at a different combination of a first process variable, a second process variable, and a third process variable; the thermal characteristic may be based on a function of the first process variable, the second process variable, and the third process variable; and using the process map to determine the sensitivity of the one or more thermal characteristics may include using the process map to determine the sensitivity of the one or more thermal characteristics to changes in values of the first, second, and third process variables. The test may be conducted at a different combination of more than three process variables; the thermal characteristic may be based on a function of the more than three process variables; and using the process map to determine the sensitivity of the one or more thermal characteristics may include using the process map to determine the sensitivity of the one or more thermal characteristics to changes in values of the more than three process variables.

Using the process map to determine the sensitivity of the one or more thermal characteristics may include identifying a direction within a process variable space that yields a maximum change in the one or more thermal characteristics, within the process variable space. The direction may include a direction that is normal to a curve or a surface or a hypersurface of the process map of the one or more thermal characteristics. The operations of conducting, generating, and using may be implemented by one or more processing devices.

In yet another aspect of the present disclosure, a method includes conducting a plurality of tests on process variables of a thermal process, with a test of the plurality of tests being conducted on two or more process variables, the test comprising: locally heating a region of a structure, wherein the local heating results in formation of a thermal field in the structure; assessing one or more thermal characteristics of the thermal field; based on results of the plurality of tests, generating a process map of the one or more thermal characteristics of the thermal field, with the one or more thermal characteristics based on a function of the two or more variables; and using the process map to apply concepts of differential geometry to an analysis of the thermal process.

Particular implementations of the subject matter described in this disclosure may be implemented to realize one or more of the following potential advantages. In general, the generation of process maps may enable the relationships between process variables and final part quality to be understood with minimal experimentation or simulation. The processing knowledge that may be gained from process mapping techniques can be extended over a wide range of process variables, thus providing a way to compare results from different pieces of equipment, different manufacturing techniques, or both. Furthermore, process mapping techniques can be used as the basis for an evolving database characterizing the deposition of complex shapes. The identification of directions in processing space yielding maximum changes in process characteristics can advance efforts to minimize process outcome variability caused by fluctuations in process variables.

Details of one or more implementations are set forth in the accompanying drawings and the description below. Other features, objects, and advantages will be apparent from the description, the drawings, and the claims.

DETAILED DESCRIPTION

Although the techniques described in the present disclosure are applicable to a wide range of thermal processing methods, various implementations will be described below in the context of additive manufacturing involving a melt pool. While specific implementations are described, other implementations may exist that include operations and components different than those illustrated and described below. For example, the techniques described herein can be used to develop AM or direct digital manufacturing processes that involve the feeding of material in wire or powder or other form into a melt pool. The techniques described herein can be applied to a variety of processes involving the formation of a melt pool, such as welding processes (even if not used to build a shape). These techniques may also be applied to other AM processes that do not involve the direct feeding of material into the melt pool, such as (but not limited to) powder bed AM processes, and to analogous welding processes.

Figure 1:
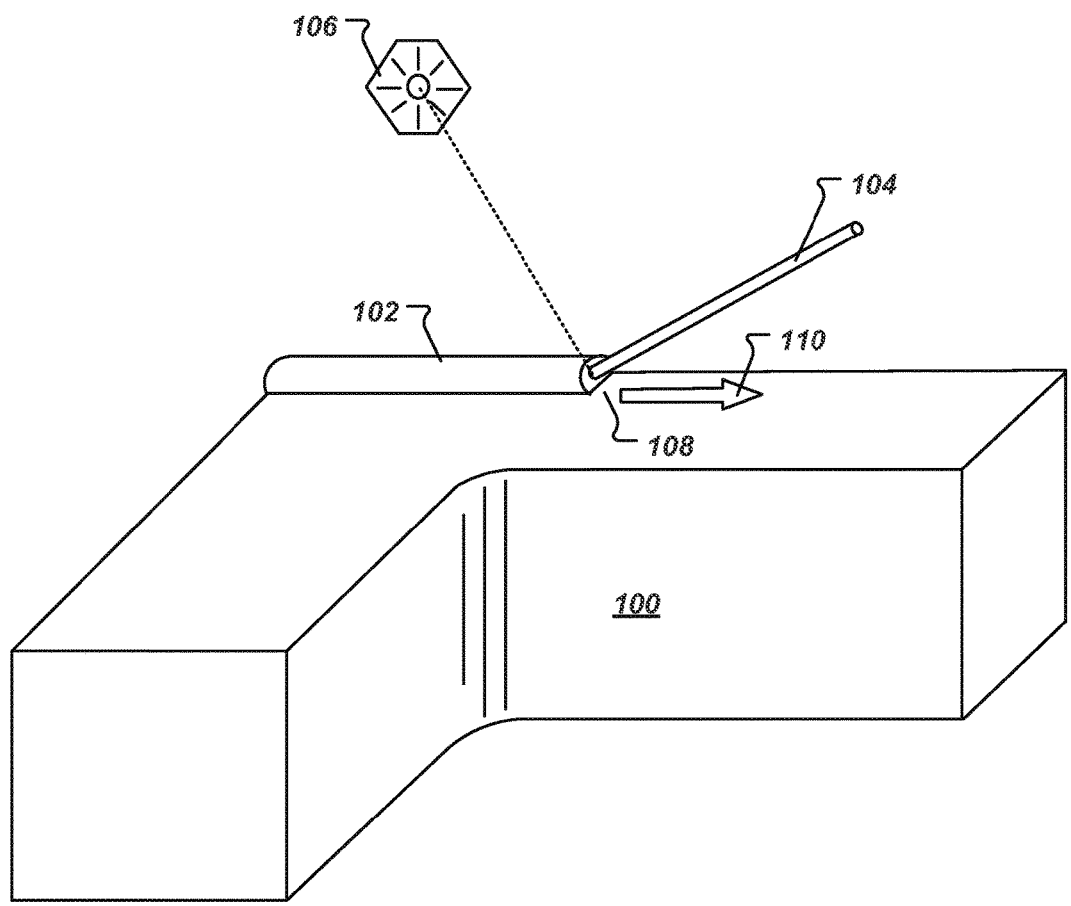
FIG. 1 is a block diagram showing an example of geometry deposition using a beam-based additive manufacturing process.

FIG. 1 is a block diagram showing an example of geometry deposition using a beam-based additive manufacturing (AM) process. In such an AM process, a structure or part 100 is fabricated by deposition of successive beads 102 of molten material. The material is provided from a material source 104, such as a wire feed (as shown), a powder feed, or a powder bed. A heat source 106, such as an electron beam, a laser beam, or an electric arc, melts the material source 104 to generate the bead 102 while melting some of the top surface 108 of the part 100. The heat source 106 is translated relative to the part 100 (or the part is translated relative to the heat source) to cause deposition of beads in a desired geometry to form the part 100.

A melt pool itself is not required. For instance, in beam-based surface heat treating processes, in which a beam is rapidly moved across a surface to alter near-surface microstructure without melting, the techniques described herein can be used to map average temperatures within a zone surrounding the heat source, and the sensitivity of those average temperatures to fluctuations in heat source power. Finally, the type of heat source involved is also general. For instance, different welding processes use a variety of mechanisms for heating, including a metal arc, gas combustion, electrical resistance, friction, and ultrasonics. The techniques described herein can be applied to each of these and others.

For a single specified material or a specified combination of materials, the primary process variables that control AM processes are power (P) of the heat source 106, the translation speed (V) of the heat source 106, the material feed rate (MFR, in units of volume per time) of the material source 104 or a related variable, one or more process variables related to the geometry being deposited and the temperature ($T_0$) of the part 100 away from the location 108 of the heat source on the part. These process variables also control other similar manufacturing processes, such as welding processes (including those that do not involve melting of the material) and beam-based surface heat treating processes (which would involve the limiting case of MFR=0). In addition, many secondary process variables and conditions can affect processing, including, for instance, beam focus, wire or powder particle diameter, deposition environment (e.g., deposition in a vacuum or in an inert gas environment), and other variables.

The techniques described herein provide a method for mapping the role of primary process variables in determining integrated thermal field characteristics resulting from deposition of a bead, as secondary process variables are held constant. The techniques can also be used in cases where secondary process variables vary, but they are determined by the primary process variables. In cases where secondary process variables change independently or randomly, the techniques can help identify when they affect integrated thermal field characteristics by first separating out the role of the primary process variables. Once this is done, studies of secondary process variables can be performed by adding them to the process variable list and mapping their influence on integrated thermal field characteristics.

The techniques described herein are applicable to the deposition of single beads of material onto an existing large plate. These techniques can also be applied to the fabrication of more complex three-dimensional shapes. Although AM processes are typically used to fabricate metal parts, the techniques described herein can be used to support the fabrication of parts of any material compatible with thermal AM processing, welding, beam-based surface heat treating, or other similar manufacturing processes. As described in this disclosure, process maps are developed for a single material or a specified combination of materials. If the material or material combination is changed, new process maps should be developed.

Figure 2:
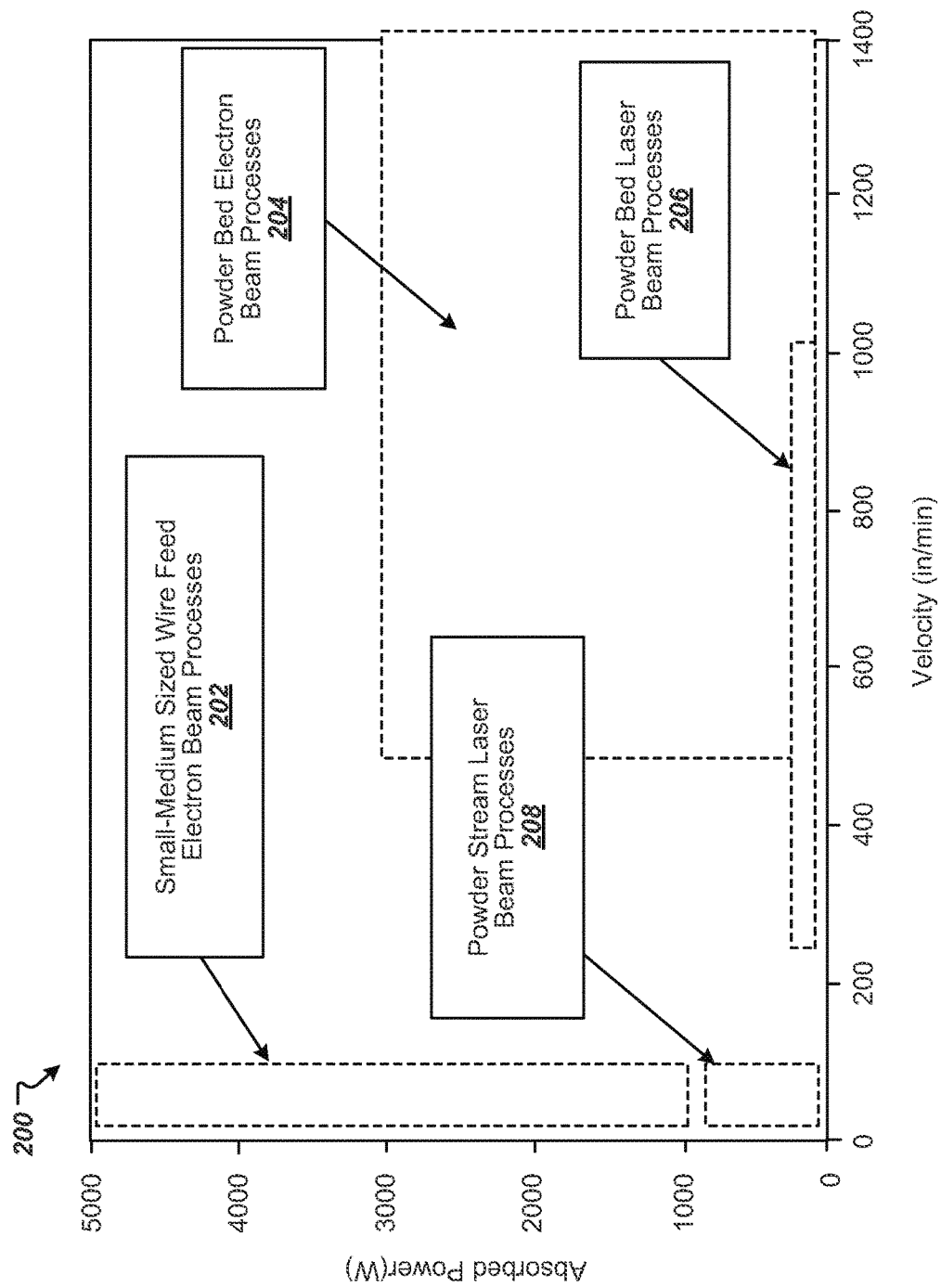
FIG. 2 is a plot of approximate ranges of power and velocity used in examples of additive manufacturing processes for metals.

FIG. 2 is a plot 200 of approximate ranges of power and velocity used in examples of additive manufacturing processes for metals. Many types of manufacturing processes spanning a wide range of process variables fall under the purview of AM processing. For instance, AM processes include small- and medium-scale electron beam wire feed processes 202, electron beam powder bed processes 204, laser power bed processes 206, and laser powder stream processes 208. Large-scale electron beam processes operating at beam powers of, e.g., 20 kW or more (not shown in FIG. 2) may also be considered to be AM processes. The techniques described herein are applicable to the full range of process variables used in these and other AM processes.

Integrated Thermal Field Characteristics

Figure 3:
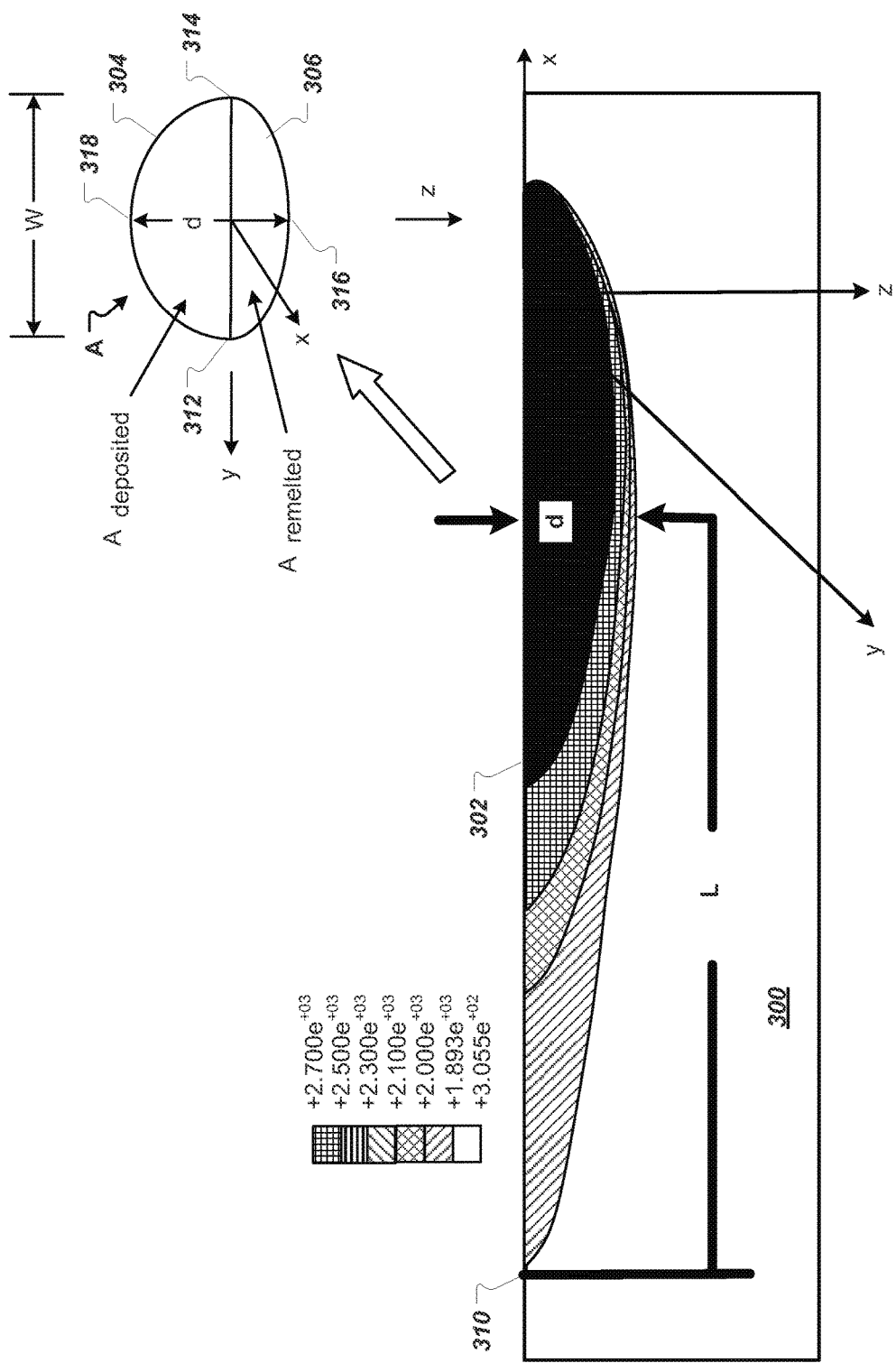
FIG. 3 is a diagram of melt pool dimensions and melt pool locations.

FIG. 3 is a diagram of melt pool dimensions and locations. Referring to FIG. 3, when a bead of material is deposited onto a surface of a part 300 in an AM process, a melt pool 302 is formed including the molten bead 304 of material (seen in cross section) and any material 306 of the surface that has melted as a result of the bead deposition. A side-view cross-section of a melt pool 302 on the surface of a part 300, derived from a finite element model, depicts melt pool dimensions that may be relevant to process control and the definition of integrated thermal quantities. In FIG. 3 the melt pool 302 is moving in the positive x direction (i.e., the direction of V).

In general, when a local heat treatment is applied to a region of a part (e.g., via a moving heat source), a thermal field is created in the part. In some instances, some of the thermal field is melted; in other instances, the temperatures of the thermal field are raised relative to the temperature of the surrounding material, but melting does not occur. In the following description, reference is made to the dimensions of the melt pool; however, the dimensions of the thermal field may be treated similarly to the dimensions of the melt pool. In FIG. 3, the maximum melt pool cross-sectional area, A, is the area of the melt pool 302 normal to the x-axis (and thus normal to the direction of travel of the melt pool 302), at the deepest point of the melt pool 302. The melt pool length, L, is the length of the melt pool 302 from the x location of A to a location 310 of the trailing tip of the melt pool 302. The melt pool depth, d, is indicative of the maximum depth of the melt pool 302. In some instances, d is the actual maximum depth of the melt pool 302. In other cases, d is an effective depth of the melt pool 302 as calculated from A using the formula $d=\sqrt{2A/\pi}$. The maximum melt pool cross-sectional area, A, equals the cross-sectional area of the deposited bead 304 ($A_{deposited}$) plus the cross-sectional area of the material 306 melted on the surface of the part 300 ($A_{remelted}$). The melt pool length, L, relates to the shape of the solidification front behind the melt pool 302. In some cases, a dimensionless variable, L/d, is used, which relates to the aspect ratio or shape of the trailing end of the melt pool 302.

An integrated thermal field characteristic is a quantity determined by integrating thermal field quantities. Examples of integrated thermal field characteristics include (but are not limited to) the average temperature over an area or volume of material at a single time or the average temperature over time at a single location. One example of an integrated thermal characteristic is the average temperature within the melt pool. The average temperature within the melt pool may be calculated as the three-dimensional integral of temperatures over the volume of the melt pool (at a specified time) divided by the melt pool volume. Another example of an integrated thermal characteristic is the average temperature across an area, such as the melt pool cross-sectional area A. The average temperature across the melt pool cross-sectional area may be calculated as the two-dimensional integral of temperatures over A divided by A. Yet another example of an integrated thermal characteristic is the average temperature over time at a specified location, such as on the part surface (z=0) at a specified surface location. The average temperature at the location may be calculated as the one-dimensional integral of temperatures at that location over the time period of interest, divided by the total elapsed time. Many other versions of integrated thermal field characteristics combining integrals over time and space could be of interest in characterizing AM and other similar processes.

Primary Process Variables

The process mapping techniques described herein enable mapping of the role of primary process variables on integrated thermal field characteristics. First, however, the primary process variables determining the integrated thermal field characteristic must be established. In some implementations, the primary process variables are P, V, MFR, one or more variables describing the geometry being mapped, and the part temperature away from the heat source, $T_0$.

The part temperature, $T_0$, can be due to active preheating of the part through external means or can be due to heat build-up from the heat source, e.g., caused by prior deposition of material. Part temperature away from the heat source is easily monitored in real time. Any location may be selected for monitoring $T_0$, provided the location is away from the local thermal field of the heat source and is consistent throughout the tests (simulations or experiments).

In other implementations, an alternative primary variable, γ, can be used in place of the MFR. The variable γ, which represents the deposited to remelted area ratio (γ=$A_{deposited}$/$A_{remelted}$), directly relates the size of the added bead of material to the size of the material melted in the existing part and thus relates the effect of those sizes on heat transfer into the part. The variables γ and MFR are related. Specifically, MFR=V*$A_{deposited}$, where A=$A_{deposited}$+$A_{remelted}$. From these relationships, it can be determined that $$MFR = V*A / \left(1 + \left(\frac{1}{\gamma}\right)\right).$$

In manufacturing applications, γ is bounded by a value of 0 (for no added material) to infinity (for no remelting of the substate material). When process mapping is used to determine the role of process variables and local bead geometry on melt pool dimensions, the use of γ may be more relevant. For manufacturing control, MFR may be the more relevant variable. Alternative process variables related to MFR may also be used for process mapping. For example, the variable φ=$A_{deposited}$/A may be used. The variable φ takes on a role similar to γ, except that φ has an operating range from 0 (for no added material) to 1 (for no remelted substrate material).

Commonly Fabricated Geometries

Figure 4:
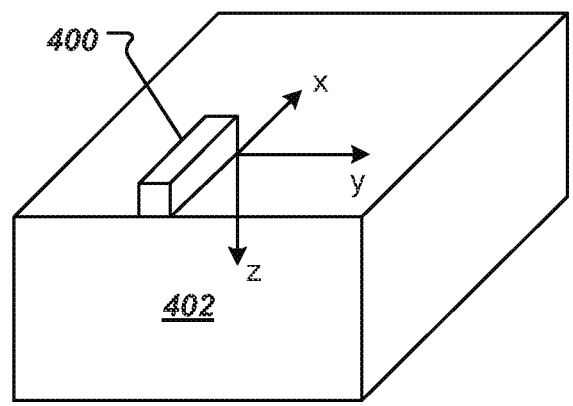
FIG. 4 is a block diagram of a single bead geometry.
Figure 5:
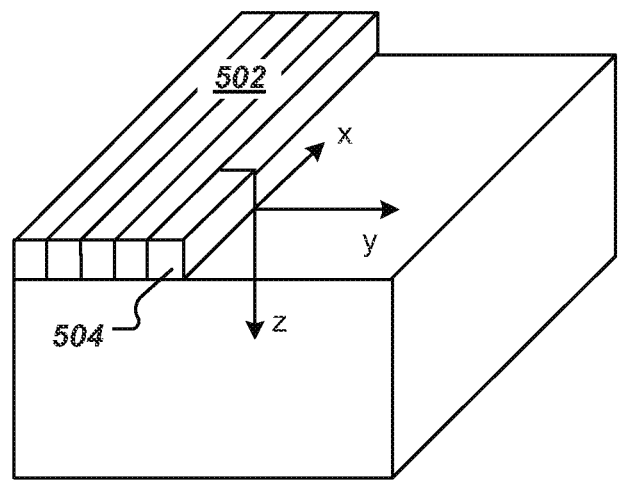
FIG. 5 is a block diagram of a sequential bead geometry.
Figure 6:
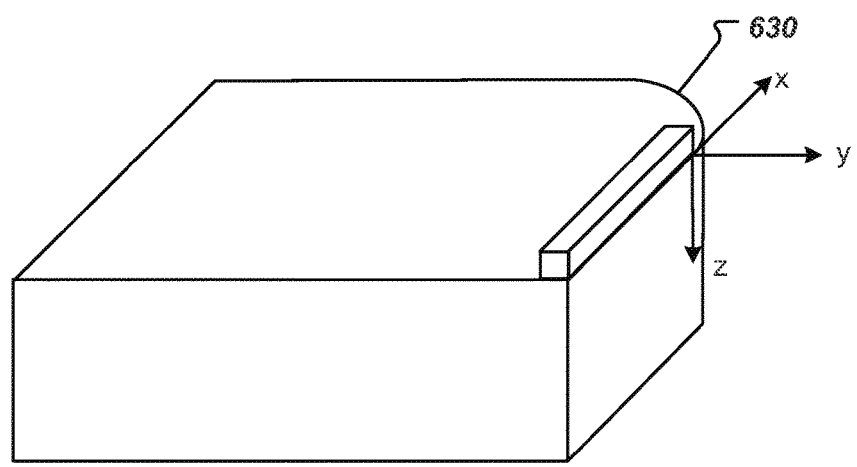
FIG. 6 is a block diagram of an external radius geometry.

Process mapping of the deposition of complex 3-D shapes can be decomposed into combinations of simpler, commonly fabricated geometries, each of which may have one or a series of associated process maps. FIGS. 4-6 are block diagrams showing examples of some commonly fabricated geometries or features. The geometries shown in FIGS. 4-6 are provided for illustration. Other commonly fabricated geometries are described in International Application No. PCT/US2013/055422 and International Application No. PCT/US2012/048658. In the geometries shown in FIGS. 4-6, the coordinate origin is taken to be the location where the heat source is positioned, and deposition proceeds in the positive x direction. In the geometries shown in FIGS. 4 and 5 (referred to as "steady-state geometries"), the geometry is constant in the deposition direction (away from free edges of the geometry). In the geometries shown in FIG. 6 (referred to as a "transient geometry"), the geometry changes in the deposition direction.

FIG. 4 is a block diagram of a single bead geometry. In single bead deposition, a single bead 400 of material is deposited onto a flat plate 402. In general, the plate 402 is large enough in the x and y directions that the melt pool geometry in the middle of the plate 402 (and other characteristics of the near-melt-pool thermal field) are not affected by the free edges of the plate 402. The plate thickness (in the z direction) may be large enough that the bottom surface does not affect the near-melt-pool thermal field. Alternatively, the plate thickness may be a thickness selected by a user and held constant across all tests.

FIG. 5 is a block diagram of a sequential bead geometry. This geometry may be used to fill an internal area. For this geometry, many beads 502 are assumed to exist to the left of a bead 504 being deposited.

FIG. 6 is a block diagram of an external radius geometry. For this geometry, there may be various radii, e.g., external radius 630, to be mapped. In addition, various turn angles can be mapped; a 90° turn is a common example of a turn angle.

One or more steady-state geometries, transient geometries, or both may be combined to result in the deposition of a single layer of an arbitrary planar shape. Building of successive layers allows the building of arbitrarily complex 3-D shapes.

In steady-state geometries (e.g., the geometries shown in FIGS. 4 and 5), if process variables are held constant during deposition, then the near-melt-pool thermal field does not change because the geometry of the feature does not change in the deposition direction. In transient geometries (e.g., the geometry shown in FIG. 6), as deposition progresses under constant P, V, γ, and $T_0$ conditions, the near-melt-pool thermal field is generally changed via its interaction with the radius. The techniques described herein for generating process maps can be applied to map steady-state or transient geometries. When mapping transient geometries for each combination of process variables, integrated thermal field characteristics will generally be a function of location of the moving heat source as it travels through the changing geometry (adding another variable to the process map).

P-V Process Mapping of an Integrated Thermal Field Characteristic

Figure 7:
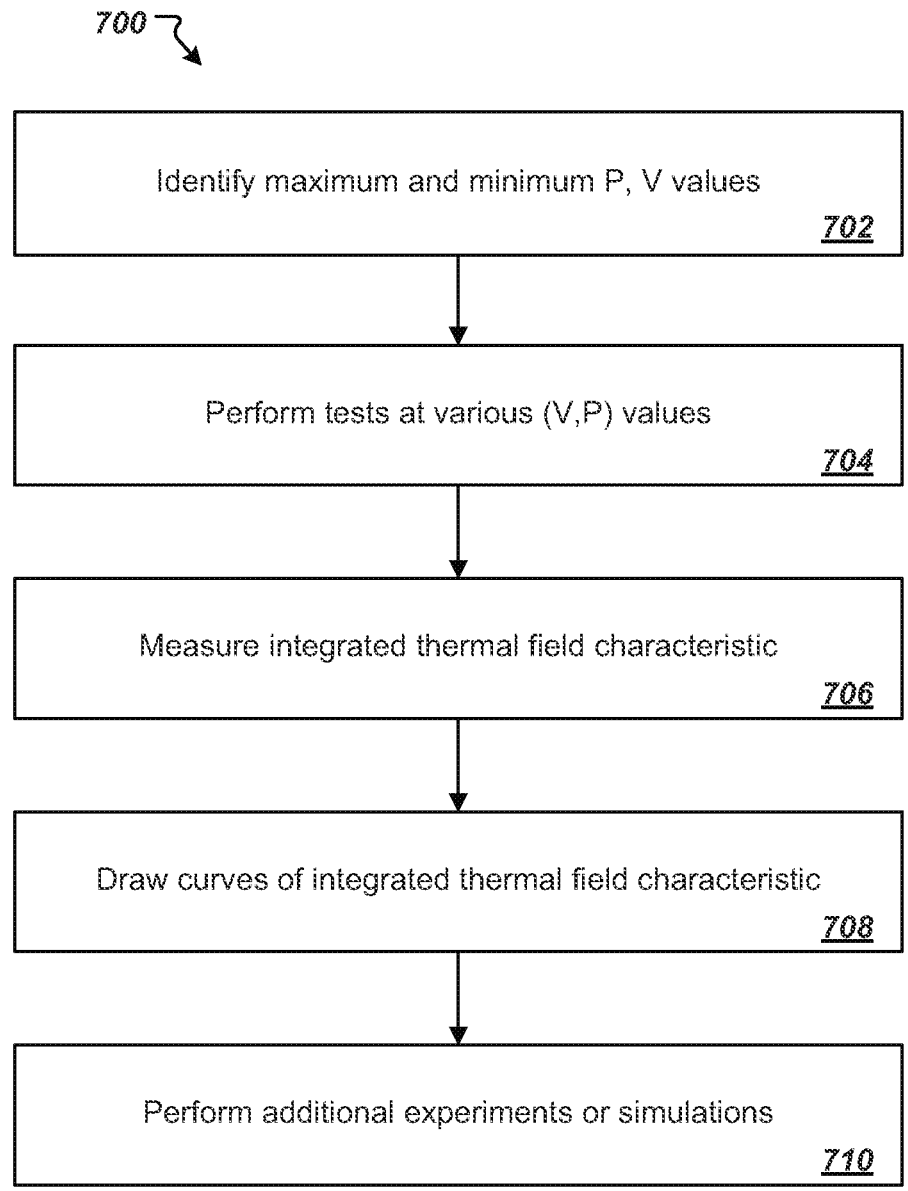
FIG. 7 is a flowchart of an example of a process for generating a power-velocity (P-V) process map for a melt pool area A.

Process mapping of steady-state values of an integrated thermal field characteristic in terms of primary process variables P and V, applicable to AM processes, will now be described with reference to FIG. 7. FIG. 7 is a flowchart of an example of a process 700 for generating a power-velocity (P-V) process map for an integrated thermal field characteristic. In this implementation of process mapping, all other primary process variables are assumed to be held constant.

In AM processing, the value of γ is typically held constant, so process maps for a single value of γ may be most relevant. Thus, details are given for P-V process mapping for a single value of γ (or ϕ) using a small number of initial experiments and/or simulations. Process maps for a fixed value of MFR, ϕ, or another parameter related to MFR may also be developed using similar procedures. Integrated thermal field characteristics can also be mapped for multiple values of γ (e.g., for selected values of γ and/or for the entire range of γ) using similar techniques.

Other process variables (related to part geometry and far-field temperature $T_0$) are also assumed constant. Thus, the P-V process map will be developed for a single commonly fabricated geometry, or, if the commonly fabricated geometry has one or more variables associated with it (such as wall height or distance from a free edge), the P-V process map may be determined for a single value of that variable. In the implementation described below and illustrated in FIG. 7, the mapping procedure is used to map steady state values of integrated thermal field characteristics. With modification, the mapping process 700 may be used to map transient responses of integrated thermal field characteristics (e.g., how the evaporation rate changes as deposition is initiated near a plate edge and progresses toward the plate center) but in this case the location of the melt pool would become another process variable.

Figure 8:
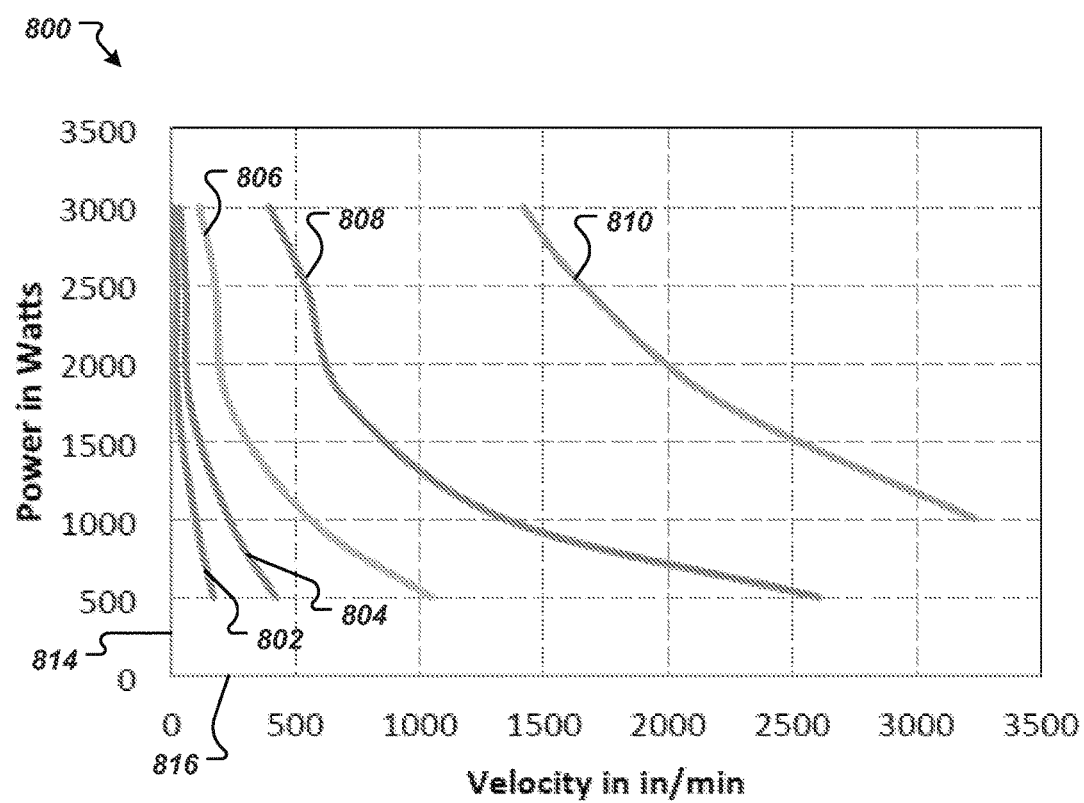
FIG. 8 is an example of a P-V process map showing curves of constant average temperature on the surface of a melt pool.

FIG. 8 is an example of a P-V process map 800 for deposition of a single bead geometry using the alloy Ti-6Al-4V and constant values of ϕ and $T_0$, as determined from numerical simulations of an electron beam powder bed AM process. The process map is for average temperatures on the surface of the melt pool, $T_{avg}^{surf}$, which can be of interest in quantifying rates of evaporation of aluminum during deposition. More specifically, $T_{avg}^{surf}$ is an integrated thermal field characteristic determined by the formula $$T_{avg}^{surf} = \frac{1}{A^{surf}} \int T^{surf} dA^{surf}$$

where $A^{surf}$ is the surface area of the melt pool (the area normal to the z axis at z=0 in FIG. 3). $T^{surf}$ is the temperature, T(x,y) on $A^{surf}$. Curves 802, 804, 806, 808 and 810 are of constant $T_{avg}^{surf}$ across the P-V plot. In FIG. 8, curve 802 represents an average temperature of 2800 K, curve 804 represents an average temperature of 2820 K, curve 806 represents an average temperature of 2840 K, curve 808 represents an average temperature of 2860 K, and curve 810 represents an average temperature of 2880 K.

To generate a P-V process map for a particular integrated thermal field characteristic, for a single value of γ, geometric variable, and $T_0$, minimum and maximum P and V values of interest (e.g., a range of P and V relevant to a particular type or types of AM process) are identified to define the P and V operating ranges for the process map (702). In the plot of FIG. 8, these could be $P_{min}$=500 W, $P_{max}$=3000 W, $V_{min}$=a value just above zero and $V_{max}$=3500 in/min.

A series of tests (experiments or simulations) within these P and V ranges (for instance, testing a rectangular grid of P, V combinations), can be used to approximately determine curves of constant integrated thermal field characteristic (704). However, it is typical that a somewhat smaller range of P, V combinations may be adequate for this task. With regard to the plot of FIG. 8, experiments can be bounded by the following values of (V, P):

1. ($V_{max}$/2, $P_{max}$)
2. ($V_{max}$, $P_{min}$)
3. ($V_{min}$, $P_{max}$)
4. ($V_{min}$, $P_{min}$)

For these initial tests, γ can be any single value between 0 (no added material) and infinity (no remelted material) and the resulting process map will be for that value of γ. However, because the melt pool areas, A, may not be known for each case (assuming no prior experiments have occurred), a nonzero value of γ may not be able to be accurately specified before each test is performed. To address this issue, initial tests may be performed with γ=0 (no added material). Subsequent tests can be performed with γ=0 to create an increasingly accurate P-V process map for γ=0. Alternatively, values of A extracted from the initial tests with γ=0 can be used to approximate MFR values associated with a desired, nonzero value of γ in subsequent tests (ultimately creating an accurate P-V process map for a single nonzero value of γ). This issue can also be avoided by creating a process map for a constant value of a quantity related to MFR other than γ or ϕ such as a map for a constant value of MFR or, for powder bed processes, a constant value of powder layer thickness.

For each test, the integrated thermal field characteristic is measured or assessed (706), along with A and $A_{deposited}$ (or $A_{remelted}$) to confirm the value of γ. These quantities are readily evaluated in thermal simulations. In experiments, integrated thermal field characteristics on the surface can be determined by thermal imaging and post processing methods. A can be determined from post process sectioning normal to the direction of beam travel, $A_{deposited}$ can be determined by dividing the MFR by V. Interpolations are then made between experimental data points allowing for the drawing of curves of constant integrated thermal characteristic (708). The type of interpolation(s) employed is up to the user. The curves shown in FIG. 7 may require some type of nonlinear interpolations in P and V to be accurate.

The accuracy of the process map can be increased by performing additional experiments and/or simulations (710). If desired, additional process maps may also be generated at different γ values, for different geometries or values of the geometric variable for one geometry, and for different values of $T_0$. Over time, data can be added to a process map such that the process map more accurately characterizes a particular piece of equipment. In some embodiments, the additional experiments and/or simulations may involve changing secondary process variables to quantify their role in changing the integrated thermal field characteristic across the range of primary process variables.

Similar mapping techniques can also be applied to a generalized thermal field, such as a region of a surface (or subsurface) that is heated (that does not have to have a maximum temperature greater than or equal to the melting temperature). Even in the case of the existence of a melt pool, it may be important to quantify integrated thermal field characteristics of regions at temperatures above or below the melting temperature (within or outside of the melt pool boundary, respectively).

Once a P-V process map for an integrated thermal field characteristic is developed it can be used to determine P and V values yielding a desired integrated thermal field characteristic value. It can also be used as a guide to maintaining the integrated thermal field characteristic as P, V, and MFR are changed. When changing V on a constant $\gamma$ or $\phi$ process map, MFR is increased or decreased proportionally with V to maintain the $\gamma$ or $\phi$ value of the map.

Construction of P-V process maps for commonly fabricated geometries allows the integrated thermal field characteristic to be maintained across all geometries. Once P-V maps are developed for commonly fabricated geometries, general, complex 3-D part geometries can be fabricated by decomposing the complex geometries into combinations of common, mapped features.

In practice, process mapping may be simplified. For instance, the effect of $T_0$ may only be a concern in certain cases, such as continuous deposition (i.e., no pausing between bead deposition) resulting in heat build-up, or deposition of one bead at a time followed by a pause to allow the part to cool to ambient temperature. If the effect of $T_0$ is only of concern in these cases, then process maps can be generated only for these cases. As another example, when a part is actively preheated to a particular $T_0$ value prior to deposition, only a few values of $T_0$ may be of interest. Process mapping for multiple values of $\gamma$ can be similarly simplified by first constructing maps for the extreme values of $\gamma=0$ (no added material) and $\gamma$ approaching infinity (no remelted material) to determine the importance of $\gamma$.

Mapping of Process Sensitivity

An important concern in AM and related thermal processes is the sensitivity of the process to changes or fluctuations in one or more process variables. In particular, the sensitivity of some thermal process characteristic (such as melt pool geometry, temperature derivatives such as cooling rates or thermal gradients, or integrated thermal field characteristics) to changes in process variables may be of concern. In some cases, sensitivity to process variable changes is good, such as when a rapid change in a thermal process characteristic is desired in a process control system. In other cases, sensitivity to process variable changes is bad, such as when minor fluctuations in process variables yield undesired physically significant fluctuations in a thermal process characteristic.

The sensitivity of process thermal characteristics to changes in process variables may be dependent on the location within process variable space where the change occurs (i.e., the values of primary process variables P, V, $\gamma$, deposition geometry, and $T_0$) and the specific process thermal characteristic being considered. This sensitivity can be characterized by process maps. The thermal characteristics that can be mapped can be any quantity related to the thermal field, including thermal field dimensions, temperature derivatives (in time or space), temperature integrals (in time or space), or combinations of these. As with other process mapping techniques, the thermal process that is mapped is also general and not limited to additive manufacturing processes.

Figure 9:
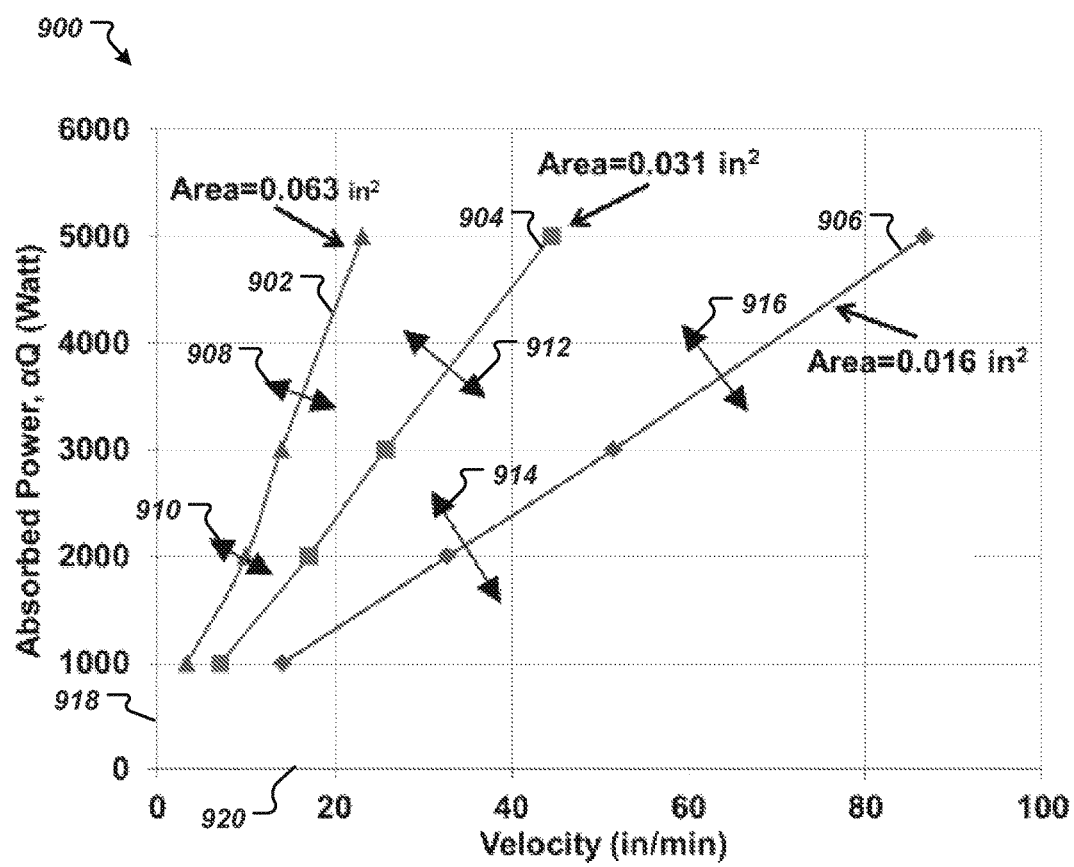
FIG. 9 is an example of a P-V process map showing curves of constant melt pool area A and directions of maximum change in A.

FIG. 9 is an example of a P-V process map 900 showing curves 902, 904, 906 of constant melt pool area A and directions 908-916 of maximum change in A. As shown in FIG. 9, curve 902 represents A=0.063 in$^2$, curve 904 represents A=0.031 in$^2$, and curve 906 represents A=0.016 in$^2$. The P-V process map 900 for A is based on numerical modeling of a wire feed electron beam AM process over multiple simulations. The map 900 is for the deposition of a single bead of the titanium alloy Ti-6Al-4V with a single value of $\gamma$ and $T_0$. The minimum and maximum P values are approximately 1 kW and 5 kW, respectively, as shown by axis 918, and the minimum and maximum V values are approximately 5 in/min and 90 in/min, respectively, as shown by axis 920.

The curves 902-906 are curves of three different constant values of A. At any location along a single curve, the directions normal to the curve are the directions in P-V space yielding a maximum change in A (or maximum sensitivity of A to changes in P and V). Directions normal to the curves of constant A at various locations are designated by black lines with arrows 908-916. The "direction" in P-V space yielding the maximum sensitivity of A to changes in P and V is a function of the A value (the curve), and it can be function of the location along each curve if the curve is not linear.

This result is general in that it applies to any thermal process characteristic plotted in P-V space. It is also general as more variables are plotted or considered at once. For instance, for a 3-D process map in terms of P, V, and $T_0$, the direction of maximum sensitivity to changes in P, V, and $T_0$ will be the normal (at a point) to the surface of a constant thermal process characteristic. This can be understood by the fact that the gradient is a vector. In a plot of two process variables, once a direction is identified in which the component of the gradient is zero (e.g., a constant A curve), then the 2-D gradient vector must be normal to this direction, and this is the direction of the maximum magnitude of change in the plotted characteristic (e.g., A).

The concept extends to a 3-D plot of a surface of a constant process characteristic (e.g., A) in terms of three process variables. Once a surface is identified in which two components of the gradient are zero (e.g., a constant A surface), then the 3-D gradient vector must be normal to that surface, and that is the direction of maximum change in the plotted characteristic (e.g., A). For a curved surface, the direction of maximum change in a process characteristic will be a function of the location on the surface.

Figure 10:
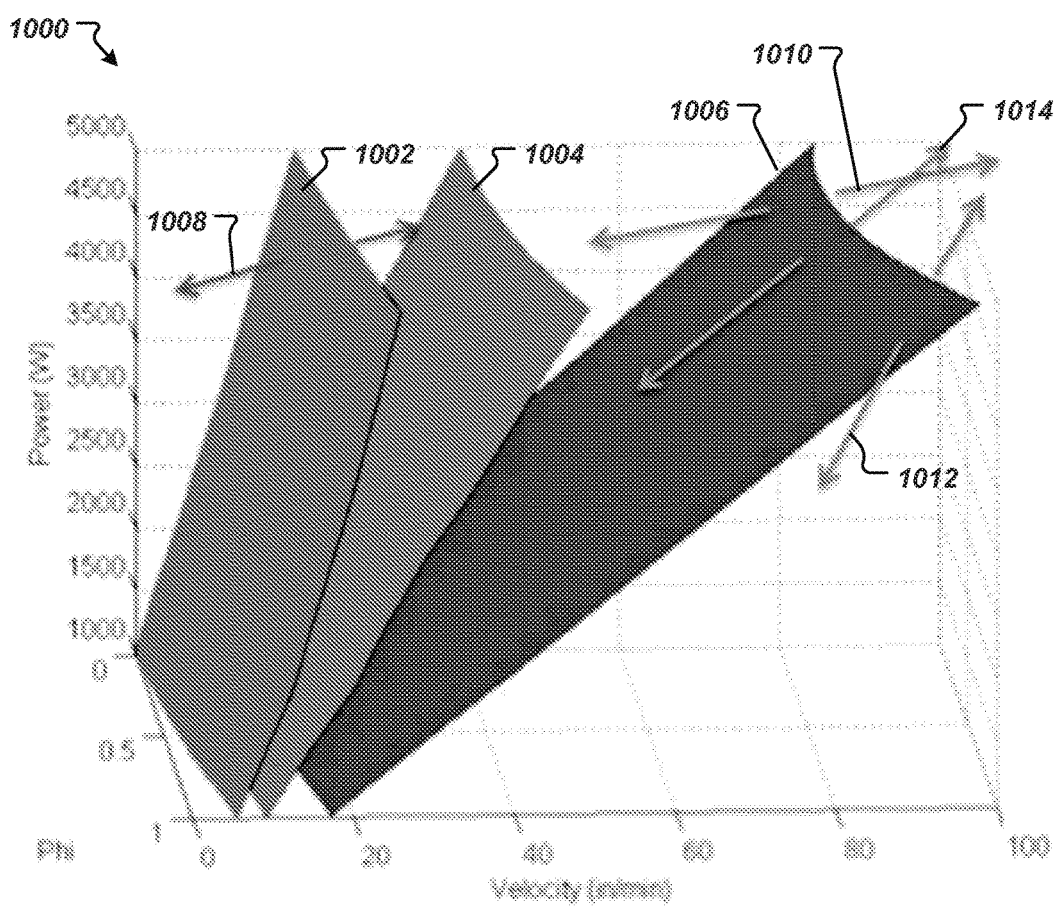
FIG. 10 is an example of a P-V-φ process map showing surfaces of constant melt pool area A and directions of maximum change in A.

FIG. 10 is an example of a P-V-$\phi$ process map 1000 showing surfaces 1002-1006 of constant melt pool cross-sectional area A (as determined by numerical models) and directions 1008-1014 of maximum change in A. Arrows 1008-1014 are shown intersecting the surfaces 1002-1006 normal to those surfaces at the point of intersection. These arrows 1008-1014 define directions in P-V-$\phi$ space yielding a maximum change in A.

Through differential geometry, this result extends to higher dimensional (n-dimensional) representations of process characteristics in terms of process variables (primary and secondary), where the direction of maximum sensitivity to process variable changes will be normal to the hypersurface of constant thermal process characteristic at any point.

The hypersurface of constant thermal process characteristic constitutes what is referred to in differential geometry as a level set, and the gradient direction is always normal to a level set.

Overall, representation of process characteristic dependence in the form of process maps allows the concepts of the broad field of differential geometry to be applied to the analysis of AM and related thermal processes. For instance, if a thermal process characteristic expressed as a function of P and V forms a developable surface, then one of its principal curvatures will equal zero. In such a case, the direction of zero curvature will be the direction of constant process characteristic (e.g., a curve of constant A). Because the directions of principal curvatures are orthogonal (normal to one another), the direction of maximum magnitude curvature will be normal to the direction of the curve of a constant process characteristic. In such cases, not only is the direction of maximum change of process characteristic (the gradient) normal to the curve of constant process characteristic, but the direction of maximum change in gradient (curvature) is also normal to the curve of constant process characteristic.

Process maps generated according to the techniques described above can be used to identify which process variables a certain process characteristic is most sensitive to, based on the direction of maximum change in that process characteristic. For example, if the direction of maximum change in process characteristic is primarily in the direction of the beam power axis (e.g., as shown in the P-V plot 900 of FIG. 9), then that process characteristic will be sensitive to minor fluctuations in beam power (more than minor fluctuations in beam velocity). The process maps may also provide insight into why some AM processes may be more sensitive to some process variable fluctuations than others, and why different process characteristics show different sensitivities within a single process. In some cases, such as applications of feedback control systems, large, rapid changes in process characteristics are desired. In such cases, the process maps can be used to identify combinations of process variables that can be changed that are most effective at achieving rapid process characteristic changes.

Figure 11:
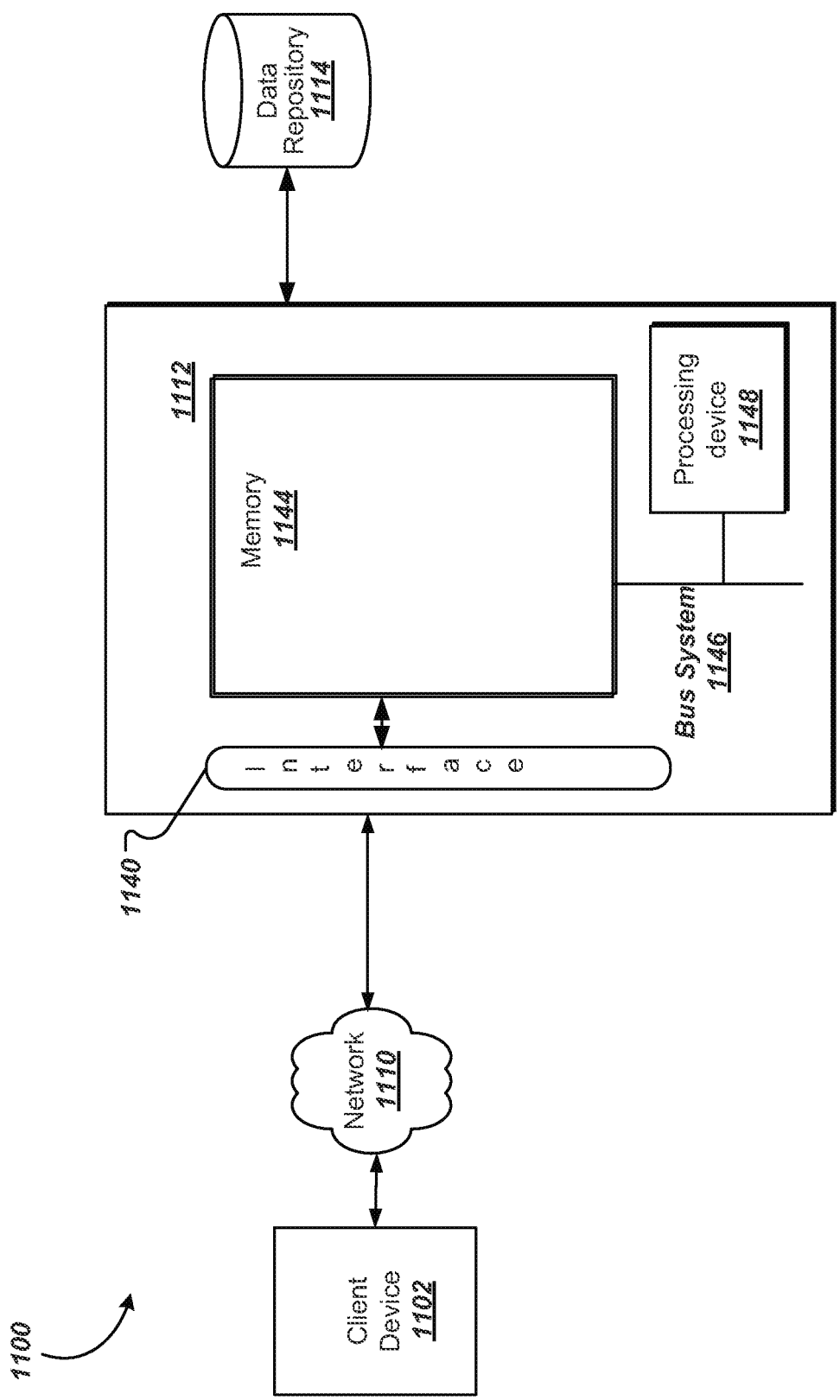
FIG. 11 is a block diagram of an example of a processing system environment for generating a process map.

FIG. 11 is a block diagram of an example of a processing system environment 1100 for generating a process map. In FIG. 11, a client device 1102 can be any sort of computing device capable of taking input from a user and communicating over network 1110 with server 1112 and/or with other client devices. For example, the client device 1102 can be mobile devices, desktop computers, laptops, cell phones, personal digital assistants ("PDAs"), servers, embedded computing systems, and so forth.

To provide for interaction with a user, the client device 1102 may include a display device (e.g., a CRT (cathode ray tube), LCD (liquid crystal display), touch screen display, or other monitor) for displaying information to the user, and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

Server 1112 can be any of a variety of computing devices capable of receiving data, such as a server, a distributed computing system, a desktop computer, a laptop, a cell phone, a rack-mounted server, and so forth. Server 1112 may be a single server or a group of servers that are at a same location or at different locations. Server 1112 can be configured to execute the techniques and operations described herein to generate a process map. In an example, server 1112 is configured to transmit, over network 1110, information indicative of the generated process map to the client device 1102.

The illustrated server 1112 can receive data from the client device 1102 via input/output ("I/O") interface 1140. I/O interface 1140 can be any type of interface capable of receiving data over a network, such as an Ethernet interface, a wireless networking interface, a fiber-optic networking interface, a modem, and so forth. Server 1112 also includes a processing device 1148 and memory 1144. A bus system 1146, including, for example, a data bus and a motherboard, can be used to establish and to control data communication between the components of server 1112.

The illustrated processing device 1148 may include one or more microprocessors. Generally, processing device 1148 may include any appropriate processor and/or logic device that is capable of receiving and storing data, and of communicating over a network (not shown). Memory 1144 can include a hard drive and a random access memory storage device, such as a dynamic random access memory, or other types of non-transitory machine-readable storage devices. Memory 1144 stores computer programs (not shown) that are executable by processing device 1148 to perform the techniques described herein.

The techniques described herein can be implemented via computational platforms. Various implementations of the techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

Embodiments can be implemented in digital electronic circuitry, or in computer hardware, firmware, software, or in combinations thereof. An apparatus can be implemented in a computer program product tangibly embodied or stored in a machine-readable storage device for execution by a programmable processor; and method actions can be performed by a programmable processor executing a program of instructions to perform functions by operating on input data and generating output. The embodiments described herein, and other embodiments of the invention, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of exemplary implementations of the invention have been described. Nevertheless, it will be understood by one of ordinary skill in the art that various modifications may be made without departing from the spirit and scope of the invention.

What is claimed is:

1. A method of controlling microstructural features in additive manufacturing, comprising:
   conducting a plurality of tests on process variables of a thermal process of an additive manufacturing process, with a test of the plurality of tests being conducted on two or more process variables, the test comprising:
      locally heating a region of a structure, wherein the local heating results in formation of a thermal field in the structure; and
      assessing one or more temperature integrals of the thermal field, at least one of the one or more temperature integrals being a function of a plurality of thermal measurements of a melt pool of the structure;
   based on results of the plurality of tests, generating a process map of the one or more temperature integrals of the thermal field, with the one or more temperature integrals based on a function of the two or more process variables; and
   controlling, in the additive manufacturing process, features in a region of an object by:
      determining, based on the process map, values for the process variables of the thermal process for causing a melt pool in the object to evaporate at a specific rate, the values being a function of the one or more temperature integrals of the thermal field;
      adjusting a heat in the region of the object based on the values that are determined for the process variables of the thermal process; and
      causing the melt pool in the object to evaporate at the specific rate.

2. The method of claim 1, wherein the two or more process variables are each selected from a group comprising a power (P) variable associated with the thermal process, a translation speed (V) variable associated with the thermal process, a material feed rate (MFR) variable (or variable related to MFR) used in the thermal process, one or more structure geometry variables, and a structure temperature ($T_0$) variable.

3. The method of claim 1, wherein the one or more temperature integrals of the thermal field comprise an average temperature across a volume of the thermal field, an average temperature across a surface area of the thermal field, an average temperature at a particular location of the structure over a period of time, or an evaporation rate.

4. The method of claim 3, wherein the average temperature across the surface area of the thermal field is determined in accordance with $$T_{avg}^{surf} = \frac{1}{A^{surf}} \int T^{surf} dA^{surf},$$

where $A^{surf}$ is a defined surface area of the thermal field, and $T^{surf}$ is a temperature at a particular location on the surface area of the thermal field.

5. The method of claim 1, wherein the one or more temperature integrals are further based on a function of at least one of a location of a heat source and a change in geometry of the structure.

6. The method of claim 1, wherein the plurality of tests is conducted with process variables other than the two or more process variables held constant.

7. The method of claim 1, wherein generating the process map comprises interpolating temperature integrals.

8. The method of claim 1, further comprising:
   using the process map to select values of the two or more process variables to yield a selected temperature integral of the thermal field, to identify combinations of process variables that yield a particular value of a temperature integral, or to identify regions of process variable space where the one or more temperature integrals are minimized or maximized.

9. The method of claim 1, wherein:
   the test of the plurality of tests is conducted on a first process variable, a second process variable, and a third process variable; and the one or more temperature integrals is based on a function of the first process variable, the second process variable, and the third process variable.

10. The method of claim 1, wherein:
the test of the plurality of tests is conducted on different combinations of more than three process variables; and
the one or more temperature integrals is based on a function of the more than three process variables.

11. The method of claim 1, wherein the operations of conducting and generating are implemented by one or more processing devices.

12. A method of controlling microstructural features in additive manufacturing, comprising:
conducting a plurality of tests on process variables of a thermal process of an additive manufacturing process, with a test of the plurality of tests being conducted on two or more process variables, the test comprising:
locally heating a region of a structure, wherein the local heating results in formation of a thermal field in the structure; and
assessing one or more thermal characteristics of the thermal field;
based on results of the plurality of tests, generating a process map of the one or more thermal characteristics of the thermal field, with the one or more thermal characteristics based on a function of the two or more process variables;
using the process map to determine a sensitivity of the one or more thermal characteristics to changes in values of the two or more process variables; and
controlling, in the additive manufacturing process, features in a region of an object by:
determining values for the process variables of the thermal process, the values being based on the sensitivity of the one or more thermal characteristics to changes in values of the two or more process variables; and
adjusting, during the additive manufacturing process, heat of the object based on the values that are determined for the process variables of the thermal process to reduce fluctuations in the one or more thermal characteristics relative to fluctuations in the one or more thermal characteristics without adjusting the values of the process variables.

13. The method of claim 12, wherein the two or more process variables are each selected from a group comprising a power (P) variable associated with the thermal process, a translation speed (V) variable associated with the thermal process, a material feed rate (MFR) variable (or variable related to MFR) used in the thermal process, one or more structure geometry variables, and a structure temperature ($T_0$) variable.

14. The method of claim 12, wherein the one or more thermal characteristics of the thermal field comprises a dimension of the thermal field, a temperature derivative, a thermal gradient, a cooling rate, a temperature integral, an average temperature, or an evaporation rate.

15. The method of claim 12, further comprising:
using the process map to identify combinations of process variables that yield a maximum change in the one or more thermal characteristics.

16. The method of claim 12, wherein:
the test is conducted at a different combination of a first process variable, a second process variable, and a third process variable;
the thermal characteristic is based on a function of the first process variable, the second process variable, and the third process variable; and
using the process map to determine the sensitivity of the one or more thermal characteristics comprises using the process map to determine the sensitivity of the one or more thermal characteristics to changes in values of the first, second, and third process variables.

17. The method of claim 12, wherein:
the test is conducted at a different combination of more than three process variables;
the thermal characteristic is based on a function of the more than three process variables; and
using the process map to determine the sensitivity of the one or more thermal characteristics comprises using the process map to determine the sensitivity of the one or more thermal characteristics to changes in values of the more than three process variables.

18. The method of claim 12, wherein using the process map to determine the sensitivity of the one or more thermal characteristics comprises identifying a direction within a process variable space that yields a maximum change in the one or more thermal characteristics, within the process variable space.

19. The method of claim 18, wherein the direction comprises a direction that is normal to a curve or a surface or a hypersurface of the process map of the one or more thermal characteristics.

20. The method of claim 12, wherein the operations of conducting, generating, and using are implemented by one or more processing devices.

21. A method of controlling microstructural features in additive manufacturing, comprising:
conducting a plurality of tests on process variables of a thermal process, with a test of the plurality of tests being conducted on two or more process variables, the test comprising:
locally heating a region of a structure, wherein the local heating results in formation of a thermal field in the structure; and
assessing one or more thermal characteristics of the thermal field;
based on results of the plurality of tests, generating a process map of the one or more thermal characteristics of the thermal field, with the one or more thermal characteristics based on a function of the two or more variables;
performing, based on the process map, differential geometry analysis to the thermal process; and
controlling, in the additive manufacturing process, features in a region of an object by:
determining values for the process variables of the thermal process, the values being based on the differential geometry analysis; and
adjusting, during the additive manufacturing process, a heat of the object based on the values that are determined for the process variables of the thermal process to reduce fluctuations in the one or more thermal characteristics relative to fluctuations in the one or more thermal characteristics without adjusting the values of the process variable.

* * * * *